(No Model.) 2 Sheets—Sheet 2.
E. C. KRUSE.
ADJUSTABLE FEED FOR GRINDING ROLLS.
No. 601,572. Patented Mar. 29, 1898.
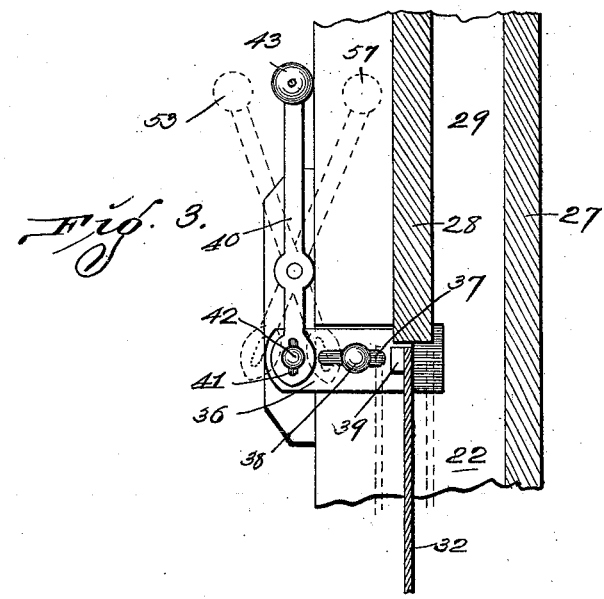
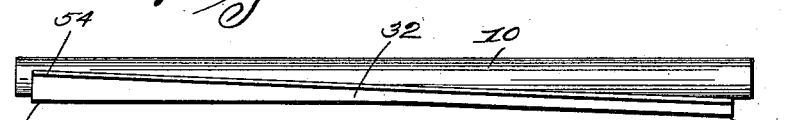
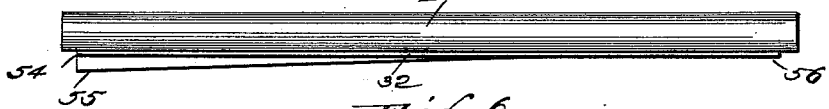
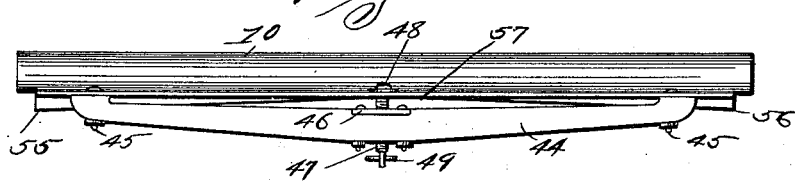
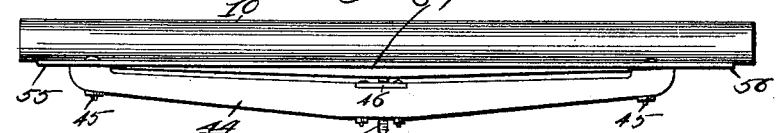
Attest:
W. P. Smith
Maud Griffin
Inventor:—
Edward C. Kruse
By Higdon Longan & Higdon
Attys.

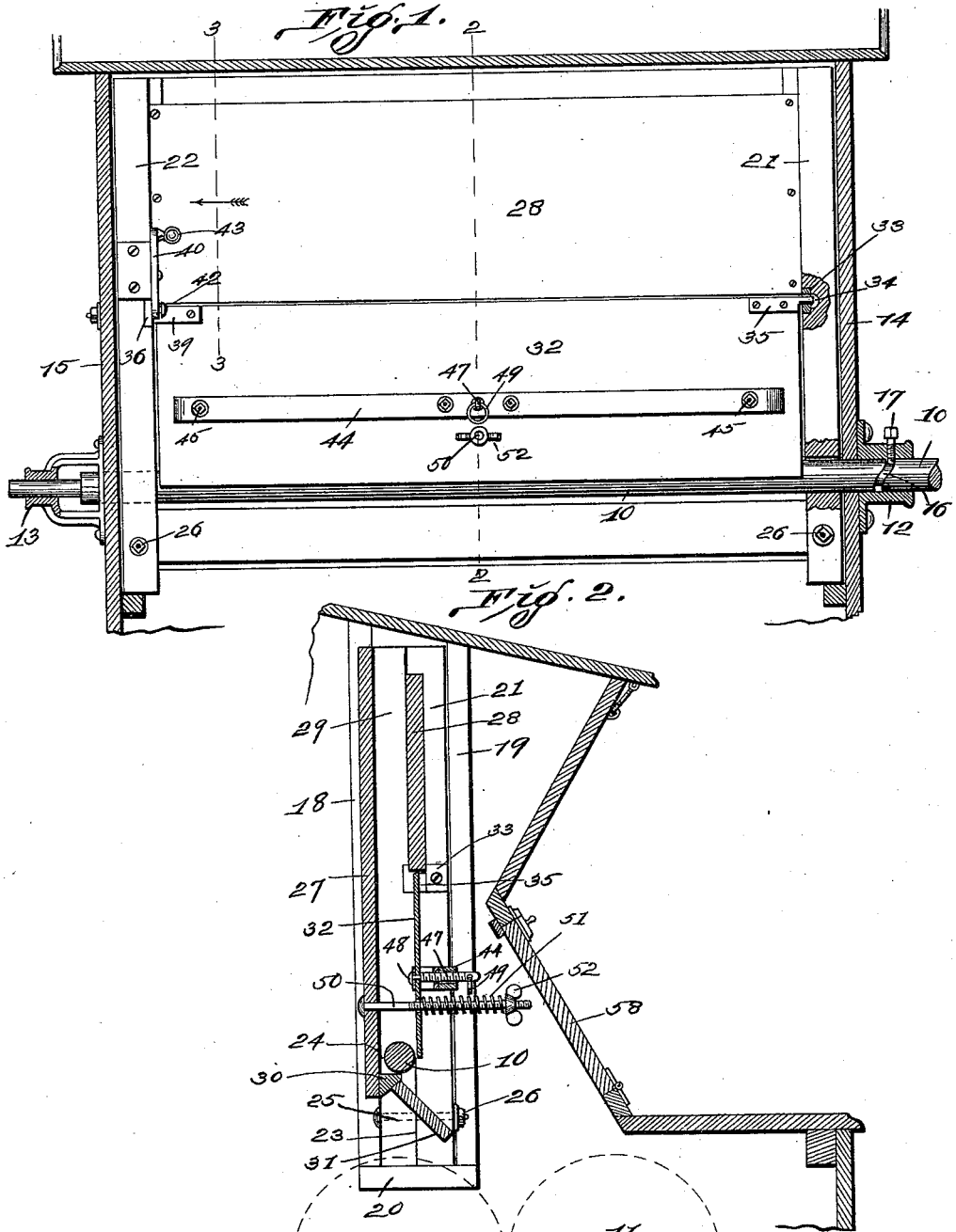

UNITED STATES PATENT OFFICE.

EDWARD C. KRUSE, OF ST. LOUIS, MISSOURI.

ADJUSTABLE FEED FOR GRINDING-ROLLS.

SPECIFICATION forming part of Letters Patent No. 601,572, dated March 29, 1898.

Application filed May 7, 1897. Serial No. 635,613. (No model.)

*To all whom it may concern:*

Be it known that I, EDWARD C. KRUSE, of the city of St. Louis and State of Missouri, have invented certain new and useful Improvements in an Adjustable Feed for Grinding-Rolls, of which the following is a full, clear, and exact description, reference being had to the accompanying drawings, forming a part hereof.

My invention relates to feeders for flouring-machines; and it consists in the novel construction, combination, and arrangement of parts hereinafter shown, described, and claimed.

Figure 1 is a front elevation of my improved feeder for flouring-machines in position for use, the casing in which the feeder is housed being shown in section and parts being broken away to economize space. Fig. 2 is a vertical sectional view taken approximately on the line 2 2 of Fig. 1, the casing being shown. Fig. 3 is a vertical sectional view taken approximately on the line 3 3 of Fig. 1 and looking in the direction indicated by the arrow. Figs. 4, 5, 6, and 7 are top plan views in the nature of diagrams and illustrating the adjustment of the feed-gage relative to the feed-roller.

In the construction of a feeder for flouring-machines and the like in accordance with the principles of my invention and referring to the drawings by numerals, 10 represents the feed-roll, which is mounted in the usual position above the grinding-rolls 11. (Shown in dotted lines in Fig. 2.) The bearings 12 and 13, in which the feed-roll 10 operates, are mounted upon and attached to the outer faces of the side pieces 14 and 15 of the housing and in a position parallel with the grinding-rolls.

In one end of the feed-roll is a cam-slot 16, formed around said roll, and a set-screw 17 is screw-seated in the bearing 12, with its point in said slot 16, as required to give a slight end motion to said roll as it rotates.

The cleats 18 and 19 are attached to the inner faces of the side pieces 14 and 15 in vertical parallel positions, one cleat upon each side of the feed-roll 10, and the cleats 20 connect the lower ends of said cleats 18 and 19. The side pieces 21 and 22 of the feeder-frame are designed to be removably positioned between the cleats 18 and 19 and rest upon the cleats 20. The end pieces 21 and 22 are sawed from their lower edges upwardly on the line 23, which is approximately at the center of said side pieces, to a point on a level with the feed-roll 10 and then on the horizontal line 24 to the rear side edges, and the blocks 25 thus formed are removed. Before cutting out the blocks 25 openings are formed through said end pieces large enough to receive the ends of the feed-roll 10. When the end pieces 21 and 22 have been placed in position, the blocks 25 are again placed in the positions from whence they came and the bolts 26 are inserted through said blocks and through the corresponding portions of the side pieces to hold said blocks securely in position. When it is desired to remove the feeder from the flouring-machine, it is only necessary to remove the bolts 26.

The back piece 27 connects the rear edges of the side pieces 21 and 22, and the front piece 28 is inserted between said end pieces in a position substantially parallel with the back piece 27 and some distance in front of said back piece, thus forming the opening 29, into which the grain is conducted by any suitable means. The front piece 28 is approximately only one-half as wide as the back piece 27 and the upper edges of said front and back pieces are approximately on a level. The lower edge of the back piece 27 extends to a point a short distance below the feed-roll 10, and the cleat 30 is attached to the front face of said lower edge and extends under said feed-roll 10 and in a position almost in contact with said feed-roll. The feed-board 31 is placed between the side pieces 21 and 22, with its upper edge under the forward edge of the cleat 30, and said feed-board extends forwardly and downwardly from said cleat at an angle of approximately forty-five degrees to a point on a level with the front edges of the side pieces 21 and 22 and a short distance above the grinding-roll.

The feed-gage 32 is a rectangular sheet-metal plate extending from the inner face of the side piece 21 to the inner face of the side piece 22 and from the lower edge of the front piece 28 to a position on a level with the center of the feed-roll 10.

The metallic plate 33 is embedded in the inner face of the side piece 21, immediately below the lower edge of the front piece 28, and an aperture is formed horizontally through said plate to receive the pin 34, which extends outwardly from the plate 35, which plate is attached to the upper corner of the feed-gage 32.

The metallic plate 36 is embedded in the inner face of the side piece 22 and in horizontal alinement with the plate 33, and said plate 36 has a longitudinal elongated slot 37 formed horizontally through its center, and a bolt 38 is inserted through said slot 37 and through the side piece 22 of the frame and the side piece 15 of the casing, thus forming a sliding adjustable connection between the plate 36 and the side piece 22. When it is desired to remove the feeder, of course the bolt 38 must be removed.

The plate 39 is attached to the upper corner of the feed-gage 32 in alinement with the plate 35, and a pin projects from said plate 39 into an aperture in said plate 36, thus forming a hinge connection between the feed-gage and the side pieces 21 and 22.

A hand-lever 40 is pivotally connected to the side piece 22, and in the lower end of said hand-lever is a vertical elongated slot 41, through which the bolt 42 passes, and said bolt is fixed in the front end of the plate 36, thus forming a sliding connection between the lever 40 and the plate 36, whereby said plate may be adjusted by manually engaging the handle 43 upon the upper end of said lever.

A truss-shaped brace 44 is mounted in a horizontal position, with its ends against the front face and near the ends of the feed-gage 32 and at approximately the center of said feed-gage, and said brace is attached to said feed-gage by bolts 45. There is no contact between the brace 44 and the feed-gage 32 at the points between the ends of said brace.

The plate 46 is attached to the inner face of the brace 44 at approximately its center, and said plate has a screw-threaded aperture in which the screw-threaded bolt 47 is seated. The inner end of the bolt 47 is reduced in size to form a shoulder, which shoulder engages the front face of the feed-gage, and the reduced portion of said bolt extends through said feed-gage, and a washer 48 is fixed upon the inner end of said reduced portion and inside of said feed-gage.

A ring or handle 49 is attached to the front end of the bolt 47 for operating the same. The center of the feed-gage 32 may be pressed away from the brace 44 or drawn toward said brace, as desired, by the manipulation of the handle 49 to turn the bolt 47.

A tension-rod 50 is inserted through the back piece 27 and through the feed-gage 32 and extends to a point a considerable distance in front of said feed-gage 32. A coil-spring 51 is placed upon the rod 50, with its inner end operating against the front face of the feed-gage 32, and the winged nut 52 is placed upon the front end of said bolt 50, as required to hold said coil-spring in position. The tension of the feed-gage against the feed-roll is regulated by manipulating the winged nut 52 and thus increasing or decreasing the tension of the spring 51 against said feed-gage 32. The feed-gage 32 is flexible to some extent and is capable of the adjustment shown in Figs. 4, 5, 6, and 7.

When the handle 43 is in position, as indicated by the dotted lines 53, the plate 36 is in its backward position. The upper left-hand corner 54 of the feed-gage 32 is forced backwardly, pressing the lower left-hand corner 55 of said feed-gage against the feed-roll and swinging the lower right-hand end 56 of said feed-gage away from the roll, as shown in Fig. 4. When the handle 43 is in the position indicated by the dotted lines 57 in Fig. 3, the plate 36 is in its forward position and the upper left-hand corner 54 of the feed-gage is pressed forwardly. The lower right-hand corner 56 is pressed against the feed-roll and the lower left-hand corner 55 is removed slightly from the feed-roll. Thus it will be seen that a wide range of adjustment is provided for the lower edge of the feed-gage 32 by the manipulation of the handle 43 and that after said feed-gage has been seated in the desired position it may be held by tightening the nut upon the outer end of the bolt 38. By manipulating the handle 49 to turn the bolt 47 and force the center of the feed-gage backwardly from the brace 44 the lower corners 55 and 56 of the feed-gage are thrown outwardly from the roll and the center 57 of said feed-gage is pressed against the roll, as shown in Fig. 6. By reversing the operation and drawing the center of the feed-gage toward the brace 44 the ends 55 and 56 of the feed-gage are pressed against the roll, and the center 57 of said feed-gage is drawn away from the roll. The endwise motion of the feed-roll, which is caused by the set-screw 17 engaging in the slot 16, operates to keep the roll clean and to equalize the wear caused by the contact between the edge of the feed-gage 32 and the feed-roll, and also operates as a shaker to prevent the grain from choking up between the feed-gage and the back piece 27. Access to the feeder for the purposes of manipulation and observation is obtained by opening the trap-door 58 in the casing, and in passing from the feed-roll 10 to the grinding-rolls 11 the grain passes over the deflector 31 and during such passage may be observed by the operator to determine whether or not the feeder is working satisfactorily.

I claim—

1. In a feeder for flouring-machines, a rotating feed-roll, a sheet-metal feed-gage in opposition to said roll, a hinge connection between said feed-gage and the frame of the feeder, a spring holding said feed-gage yieldingly in contact with the feed-roll, a truss-shaped brace having its ends attached to said feed-gage, and a connection between said truss-shaped brace and said feed-gage whereby the center of said gage may be drawn to or forced away from the center of said brace, substantially as specified.

2. In a feeder for flouring-machines, a rotating feed-roll, means of imparting an endwise motion to said feed-roll as it is rotated, a sheet-metal feed-gage in opposition to said roll, a hinge connection between said feed-gage and the frame of the feeder, a spring holding said feed-gage yieldingly in contact with the feed-roll, a truss-shaped brace having its ends attached to said feed-gage, and a connection between said truss-shaped brace and said feed-gage whereby the center of said gage may be drawn to or forced away from the center of said brace, substantially as specified.

3. In a feeder for flouring-machines, a feed-roll, a sheet-metal feed-gage in opposition to said roll, a hinge rigidly connected to one upper corner of said feed-gage and rigidly connected to the frame of the feeder, a hinge rigidly connected to the other upper corner of said feed-gage and slidingly connected to the frame of the feeder, means of adjusting said sliding hinge thereby adjusting the edge of the feed-gage relative to the feed-roll, a truss-shaped brace attached at its ends to the lower part of the feed-gage and a connection between said brace and said feed-gage at a point intermediate of the brace whereby the lower edge of the feed-gage may be bent or straightened, substantially as specified.

4. In a feeder for flouring-machines, a feed-roll, a sheet-metal feed-gage in opposition to said roll, a hinge rigidly connected to one upper corner of said feed-gage and rigidly connected to the frame of the feeder, a hinge rigidly connected to the other upper corner of said feed-gage and slidingly connected to the frame of the feeder, means of adjusting said sliding hinge thereby adjusting the edge of the feed-gage relative to the feed-roll, a truss-shaped brace attached at its ends to the lower part of the feed-gage, a connection between said brace and said feed-gage at a point intermediate of the ends of the brace whereby the lower edge of the feed-gage may be bent or straightened, and means of holding the feed-gage yieldingly in contact with the feed-roll, substantially as specified.

In testimony whereof I affix my signature in presence of two witnesses.

EDWARD C. KRUSE.

Witnesses:
EDWARD E. LONGAN,
MAUD GRIFFIN.